(12) United States Patent
Minassa et al.

(10) Patent No.: US 11,773,687 B2
(45) Date of Patent: Oct. 3, 2023

(54) SINGLE SOLENOID ELECTRO-HYDRAULIC CONTROL SYSTEM TO ACTUATE DOWNHOLE VALVES

(71) Applicant: Halliburton Energy Services, Inc., Houston, TX (US)

(72) Inventors: Lorenzzo Breda Minassa, Tomball, TX (US); Robert William Gissler, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/645,196

(22) Filed: Dec. 20, 2021

(65) Prior Publication Data

US 2022/0235624 A1 Jul. 28, 2022

Related U.S. Application Data

(60) Provisional application No. 63/141,635, filed on Jan. 26, 2021, provisional application No. 63/141,618, (Continued)

(51) Int. Cl.
*F16K 31/40* (2006.01)
*E21B 34/06* (2006.01)
(Continued)

(52) U.S. Cl.
CPC .......... *E21B 34/066* (2013.01); *E21B 34/10* (2013.01); *F16K 31/40* (2013.01); *G05D 16/204* (2013.01);
(Continued)

(58) Field of Classification Search
CPC .... E21B 34/066; F16K 31/40; G05D 16/2022
See application file for complete search history.

(56) References Cited

U.S. PATENT DOCUMENTS

| 1,372,502 A | 3/1921 | Willibald |
| 4,579,177 A | 4/1986 | Going, III |

(Continued)

FOREIGN PATENT DOCUMENTS

| CA | 1276874 C | 11/1990 |
| CN | 106593301 A | 4/2017 |

(Continued)

OTHER PUBLICATIONS

"U.S. Appl. No. 17/645,259, Ex Parte Quayle", Mar. 2, 2023, 7 pages.
(Continued)

*Primary Examiner* — Umashankar Venkatesan
(74) *Attorney, Agent, or Firm* — DELIZIO, PEACOCK, LEWIN & GUERRA (57) ABSTRACT

An electro-hydraulic control system for actuating a control valve includes a control module. The control module is coupled to the surface via two hydraulic lines and an electrical power line. The control module uses one of the hydraulic lines as an open line and the other line as a close line. The control module includes a normally closed (NC) solenoid valve (SOV) that is coupled to the electrical power line and may be controlled from the surface to open or close. The opening or closing of the NC SOV in cooperation with hydraulic pressure on an open or close line operates (i.e., closes or opens) the control valve.

17 Claims, 6 Drawing Sheets

Related U.S. Application Data filed on Jan. 26, 2021, provisional application No. 63/141,615, filed on Jan. 26, 2021, provisional application No. 63/141,630, filed on Jan. 26, 2021, provisional application No. 63/141,624, filed on Jan. 26, 2021.

(51) Int. Cl.
  *E21B 34/10* (2006.01)
  *G05D 16/20* (2006.01)
  *E21B 34/16* (2006.01)

(52) U.S. Cl.
  CPC .......... *G05D 16/2022* (2019.01); *E21B 34/16* (2013.01); *E21B 2200/02* (2020.05)

(56) References Cited

U.S. PATENT DOCUMENTS

| | | | |
|---|---|---|---|
| 4,736,791 A | 4/1988 | Rorden | |
| 4,942,926 A | 7/1990 | Lessi | |
| 4,945,995 A | 8/1990 | Tholance et al. | |
| 5,050,681 A * | 9/1991 | Skinner | E21B 34/066 166/66.4 |
| 5,065,825 A | 11/1991 | Bardin et al. | |
| 6,053,202 A * | 4/2000 | Cunningham | E21B 34/10 91/461 |
| 6,179,052 B1 | 1/2001 | Purkis et al. | |
| 6,470,970 B1 | 10/2002 | Purkis et al. | |
| 6,715,558 B2 | 4/2004 | Williamson | |
| 7,219,591 B2 * | 5/2007 | Loedige | F15B 11/006 91/446 |
| 10,605,048 B2 * | 3/2020 | MacGregor | E21B 21/103 |
| 10,745,998 B2 * | 8/2020 | Prost | E21B 34/066 |
| 11,274,526 B2 * | 3/2022 | Deville | E21B 34/14 |
| 11,435,765 B2 * | 9/2022 | Patz | F15B 21/087 |
| 11,536,112 B2 * | 12/2022 | Clayton | F16K 31/1221 |
| 11,591,884 B2 * | 2/2023 | Clayton | E21B 34/102 |
| 2001/0037884 A1 | 11/2001 | Schultz et al. | |
| 2002/0007946 A1 | 1/2002 | Purkis et al. | |
| 2006/0168955 A1 | 8/2006 | Longfield et al. | |
| 2006/0201321 A1 | 9/2006 | Loedige et al. | |
| 2006/0254763 A1 | 11/2006 | Tips et al. | |
| 2007/0163774 A1 | 7/2007 | Hosatte et al. | |
| 2010/0059233 A1 | 3/2010 | Smithson et al. | |
| 2010/0084588 A1 * | 4/2010 | Curtiss, III | E21B 34/16 251/57 |
| 2010/0236790 A1 | 9/2010 | Smithson | |
| 2012/0067593 A1 | 3/2012 | Powell et al. | |
| 2012/0073670 A1 | 3/2012 | Lymberopoulos | |
| 2017/0022790 A1 | 1/2017 | Leitch | |
| 2018/0119522 A1 | 5/2018 | Prost et al. | |
| 2019/0055812 A1 * | 2/2019 | Halily | E21B 43/162 |
| 2019/0316433 A1 | 10/2019 | Schroit et al. | |
| 2020/0190943 A1 | 6/2020 | Clayton et al. | |
| 2020/0217157 A1 | 7/2020 | Oser et al. | |
| 2020/0248533 A1 | 8/2020 | Clayton et al. | |
| 2021/0102440 A1 | 4/2021 | Minassa et al. | |
| 2021/0254431 A1 | 8/2021 | Prost | |
| 2022/0017051 A1 | 1/2022 | Kim | |

FOREIGN PATENT DOCUMENTS

| | | |
|---|---|---|
| EP | 2324192 B1 | 5/2018 |
| WO | 9747852 | 12/1997 |
| WO | 2006124024 | 11/2006 |
| WO | 2010042298 | 4/2010 |
| WO | 2019226160 | 11/2019 |
| WO | 2019246501 A1 | 12/2019 |
| WO | 2022164551 | 8/2022 |
| WO | 2022164592 | 8/2022 |
| WO | 2022164593 | 8/2022 |
| WO | 2022164594 | 8/2022 |
| WO | 2022164595 | 8/2022 |

OTHER PUBLICATIONS

"PCT Application No. PCT/US2021/064576, International Search Report and Written Opinion", dated May 31, 2022, 9 pages.
"PCT Application No. PCT/US2021/073048, International Search Report and Written Opinion", dated Apr. 19, 2022, 11 pages.
"PCT Application No. PCT/US2021/073049, International Search Report and Written Opinion", dated Apr. 19, 2022, 10 pages.
"PCT Application No. PCT/US2021/073051, International Search Report and Written Opinion", dated Apr. 18, 2022, 10 pages.
"PCT Application No. PCT/US2021/073054, International Search Report and Written Opinion", dated Apr. 15, 2022, 10 pages.
"Different Types of 3-Way Valves", Solenoid Solutions Inc., https://www.solenoidsolutionsinc.com/infographics/different-types-of-3-way-valves/, (n.d.), 5 pages.
"How A 2-Way Normally Closed Solenoid Valve Works", Solenoid Solutions Inc., https://www.solenoidsolutionsinc.com/infographics/how-a-2-way-normally-closed-solenoid-valve-works/, (n.d.), 5 pages.
"HS Interval Control Valves", Halliburton, 2017, 2 pages.
"Intelligent Completions: SmartWell Completion Systems", Halliburton, 2013, 8 pages.
"Lee Flosert® Miniature Flow Regulating Valves", https://news.thomasnet.com/companystory/lee-flosert-miniature-flow-regulating-valves-40006265, (n.d.), 6 pages.
"More on Lee Flow Controls", The Lee Company, https://www.theleeco.com/products/precision-microhydraulics/flow-control-valves/more-on-lee-flow-controls/, (n.d.), 3 pages.
"Product Details: Piloting Solenoid Valve SDBB2131002A", The Lee Company, http://leecat.theleeco.com/ecatalog/piloting-solenoid-valves/en/SDBB2131002A, 2011, 2 pages.
"SmartPlex® Downhole Control System", Halliburton, 2015, 2 pages.
"Solenoid Valves", The Lee Company, https://www.theleeco.com/products/precision-microhydraulics/solenoid-valves/, (n.d.), 4 pages.
"Technical Hydraulic Handbook (12th ed.)", The Lee Company, 2018, 819 pages.

* cited by examiner

FIG. 6

SINGLE SOLENOID ELECTRO-HYDRAULIC CONTROL SYSTEM TO ACTUATE DOWNHOLE VALVES

TECHNICAL FIELD

The disclosure generally relates to the field of obtaining hydrocarbons (e.g., as oil or gas) from wells and, more specifically, to methods and equipment for completion of wellbores and control and improvement of production.

BACKGROUND

Various tools and tool systems have been developed to control, select, and/or regulate the production of hydrocarbon fluids and other fluids produced downhole from subterranean wells. Downhole well tools such as sliding sleeves, sliding windows, interval control valves, safety valves, lubricator valves, and gas lift valves are examples of control tools positioned downhole in wells.

Sliding sleeves and similar devices are placed in isolated sections of the wellbore to control fluid flow from the wellbore section. Multiple sliding sleeves and at least one interval control valve (ICV) can be placed in different isolated sections within tubing to jointly control fluid flow within the particular tubing section, and to commingle the various fluids within a common tubing interior.

BRIEF DESCRIPTION OF THE DRAWINGS

Embodiments of the disclosure may be better understood by referencing the accompanying drawings.

DESCRIPTION OF EMBODIMENTS

The description that follows includes example systems and methods that embody examples of the disclosure. However, it is understood that this disclosure may be practiced without these specific details. For instance, this disclosure refers to electro-hydraulic circuits for controlling an interval control valve (ICV) in a completion system in illustrative examples. The embodiments of this disclosure can be also applied to controlling other downhole valves or instruments and can be implemented in any system combining hydraulic power and electric power. In other instances, well-known instruction instances, protocols, structures, and techniques have not been shown in detail in order not to obfuscate the description.

Overview

Systems for controlling multiple downhole tools, particularly ICVs, can include electric and hydraulic lines (electro-hydraulic systems). These systems use substantial power to control the downhole tools. A single solenoid electro-hydraulic control system is disclosed herein that controls downhole tools with low power consumption. The system's power consumption can be low enough to be compatible with disconnect tools using inductive coupling.

In the disclosed electro-hydraulic control system, a control module is hydraulically coupled to an ICV to control the ICV. The control module is coupled to the surface via two hydraulic lines and an electrical line. The control module uses one of the hydraulic lines as an "open" line and the other line as a "close" line. The control module includes a normally closed (NC) solenoid valve (SOV) that is coupled to the electrical line and can be controlled from the surface to open or close. The opening or closing of the NC SOV in cooperation with pressure on an "open" or "close" line of the hydraulic lines operates (i.e., closes or opens) the ICV.

The phrasing "hydraulically coupled with" refers to the coupling of components with a fluid conduit that is charged or under pressure and allows for the variations that may occur in various implementations. For instance, "component A is hydraulically coupled with component B" encompasses these non-limiting cases: A directly connected to B by a hydraulic conduit or A connected to B with one or more intervening components and multiple conduits therebetween.

Example Illustrations

Figure 1:
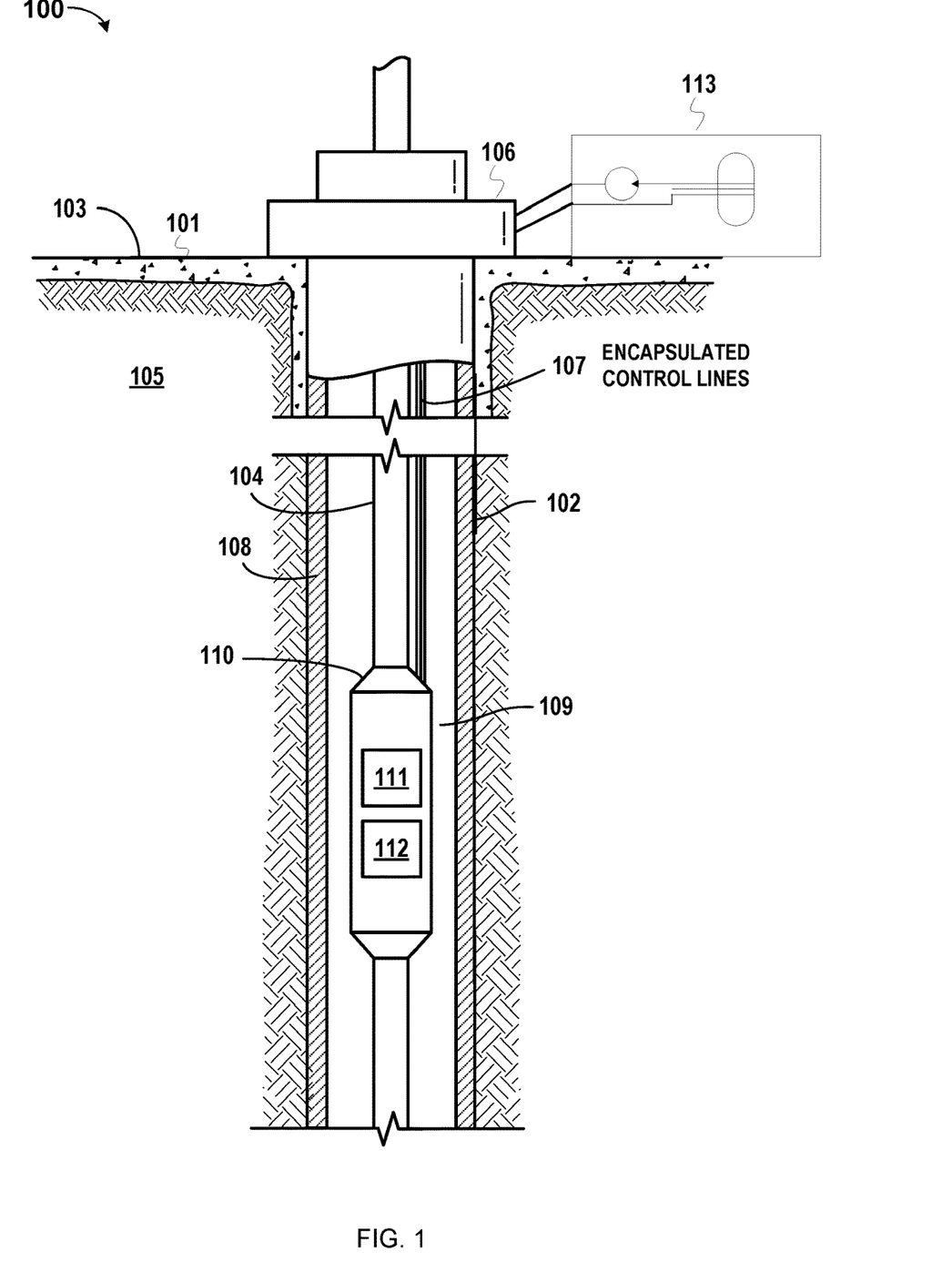
FIG. 1 depicts a partial cross-sectional view of a well completion that includes a low power electro-hydraulic circuit with a SOV that controls an ICV.

FIG. 1 depicts a partial cross-sectional view of a well completion that includes a low power electro-hydraulic circuit with a SOV that controls an ICV. The electro-hydraulic circuit is formed with a hydraulic power system 113, encapsulated control lines 107, and a control module/hydraulic manifold assembly 111. An ICV 112 controlled via the control module 111 can be considered part of the circuit or external to the circuit. The well completion 100 includes a wellbore 102 extending through, i.e., formed in, a subterranean formation 105 from a wellhead 106 located at a surface 103. The wellbore 102 includes a casing string 108. The casing string 108 can be at least partially cemented into the subterranean formation with cement 101. Although cement 101 is shown near the surface 103, the cement 101 can extend the length of the wellbore 102. Although the wellbore 102 is depicted as a single vertical wellbore, the wellbore 102 can include a deviated or horizontal portion. Although only one casing string 108 is shown, multiple casing strings may be radially and/or circumferentially disposed around casing string 108.

A tubing string 104 is positioned in the wellbore 102 inside the casing string 108, forming an annulus 109 between the tubing string 104 and the casing string 108. A completion component or sub-assembly ("sub") 110 is included in (or physically coupled to) the tubing string 104. Both the completion sub 110 and the tubing string 104 collectively (possibly with other completion subs and joined tubing) form the tubing string of the well completion 100.

Encapsulated control lines 107 extend from the surface 103 of the wellbore 102 to the completion sub 110. The control lines 107 at least include an electrical line and multiple hydraulic lines). The control lines 107 can communicatively couple the completion sub 110 to a computing device that actuates a downhole tool, e.g., one or more valves. Hydraulic lines of the control lines 107 are coupled to the hydraulic power system 113 and the control module 111. The hydraulic power system 113 converts mechanical energy into hydraulic energy that is provided to the control module 111 via the hydraulic lines of the control lines 107.

The completion sub 110 includes the control module 111 and the ICV 112. The control module 111 is coupled to the ICV 112 and includes portions of the control lines 107. Although shown as components of the completion sub 110, the control module 111 and/or the ICV 112 can be coupled directly to the tubing string 104 and/or to one another, e.g., via threaded ends.

The ICV 112 controls flow between an interior and exterior of the tubing string 104. For example, the exterior of the ICV 112 can be exposed to the annulus 109 and the ICV 112 can regulate flow between the interior of the tubing string 104 and the annulus 109.

Figure 2:
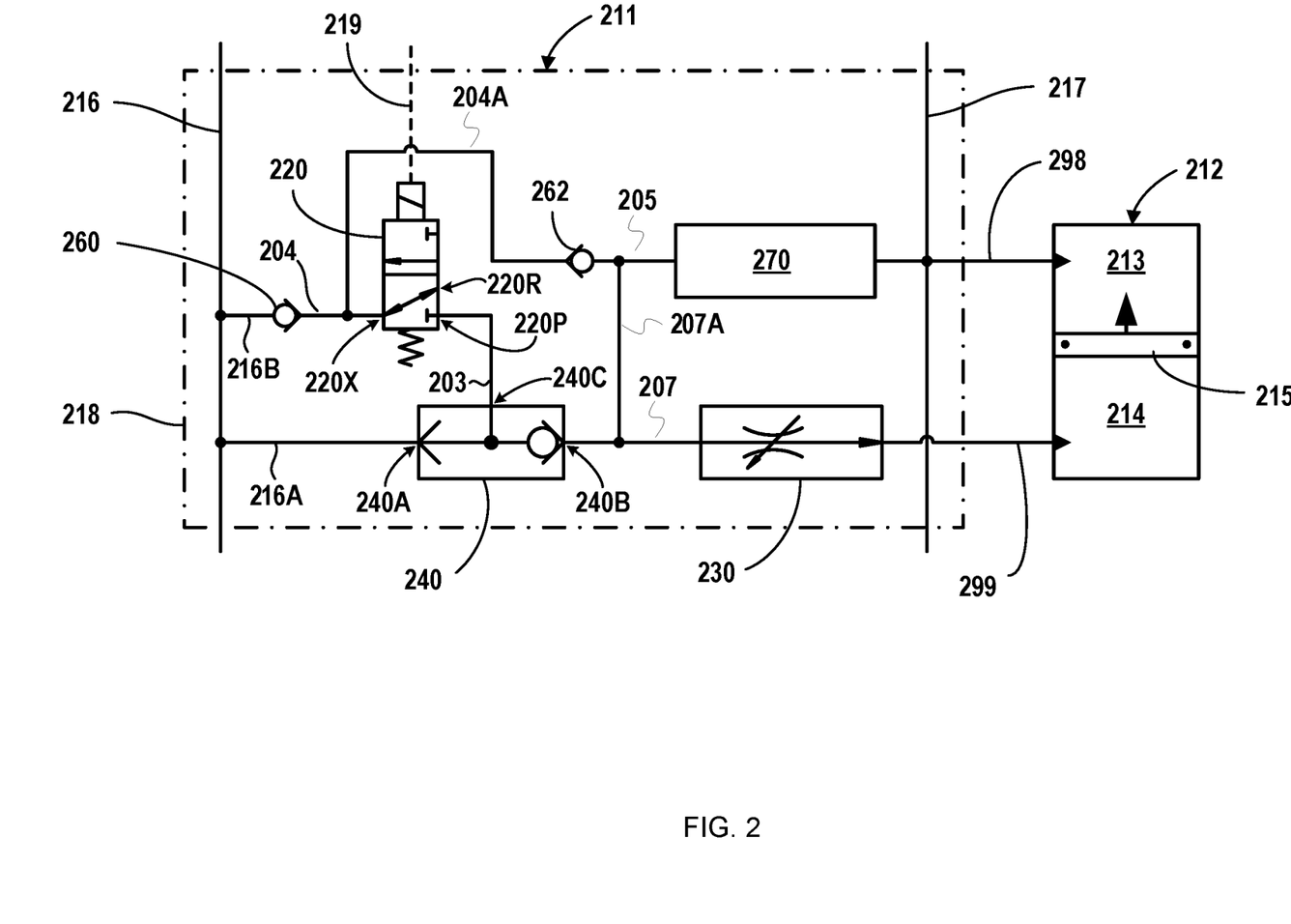
FIG. 2 depicts components of a control module of an electro-hydraulic circuit with a 3-way normally closed solenoid valve for actuating an ICV.

FIG. 2 depicts components of a control module of an electro-hydraulic circuit with a 3-way normally closed solenoid valve for actuating an ICV. A control module 211 includes a housing 218. The housing 218 can be coupled to tubing. The housing 218 protects the components of the control module 211. The components of the control module 211 include a normally closed (NC) solenoid valve (SOV) 220, a dynamic flow regulator/restrictor 230, a shuttle valve 240, a check valve 260, a check valve 262, and a flow fuse 270. The components of the control module 211 are disposed within the housing 218.

A hydraulic line 216 and a hydraulic line 217 route through the control module use 211. A "hydraulic line" as used herein refers to a hydraulic fluid conduit implemented as appropriate for the environment (e.g., a steel line or a hydraulic hose). FIG. 2 depicts the hydraulic lines 216, 217 entering and exiting the housing 218 via separate apertures. Embodiments may route the hydraulic lines 216, 217 through shared apertures. Each of the hydraulic lines 216, 217 branches within the housing 218. The hydraulic line 216 branches within the housing 218 to connect to the check valve 260 and to a port of the shuttle valve 240. The hydraulic line 217 branches within the housing 218 to connect to a port on the flow fuse 270. For the branching of the hydraulic lines, embodiments can use a tee or a flow divider. The dynamic flow restrictor provides flow control to ensure that the hydraulic circuit conforms to an operating range of pressures even with branching/splitting with tees. Some embodiments may use a flow divider in place of the dynamic flow restrictor and tee. An electrical power line 219 routes into the control module 211 through an aperture of the housing 218 to connect to the NC SOV 220. A hydraulic line 298 connects the flow fuse 270 to an ICV 212. A hydraulic line 299 connects the dynamic flow regulator/restrictor 230 to the ICV 212.

The ICV 212 is divided into two sides, an open side 214 and a close side 213, by a double-actuated floating piston 215. The movement of the double-actuated floating piston 215 controls flow of fluid between the interior of a tubing string and an annulus. For example, movement of the double-actuated floating piston 215 towards the close side 213 increases flow between the interior of the tubing string and the annulus, and movement of the double-actuated floating piston 215 towards the open side 214 reduces flow between the interior of the tubing string and the annulus. The double-actuated floating piston 215 of the ICV 212 can be fully closed, i.e., fully blocking flow between the interior of the tubing string and the annulus, or fully open to allow maximum flow between the interior of the tubing string and the annulus.

As depicted, the NC SOV 220 is a 2 position, 3-way NC SOV having a pressure port or P-port 220P, a return port or R-port 220R, and a control port or X-port 220X. The control port can also be referred to as a C-port.

The NC SOV 220 has two states, an energized state and a deenergized state, corresponding to the two positions of the valve. In the deenergized state, the NC SOV 220 is in a first, closed valve position, wherein the NC SOV 220 allows hydraulic communication between the X-port 220X and the R-port 220R and blocks hydraulic communication between the P-port 220P and the X-port 220X. The R-port 220R of the NC SOV 220 also does not allow flow thereto or therefrom, as it is not hydraulically coupled to another component. In the energized state, the NC SOV 220 is in a second, open valve position, wherein the NC SOV 220 allows hydraulic communication between the P-port 220P and the X-port 220X. The NC SOV 220 blocks hydraulic communication between the X-port 220X and R-port 220R in the open position. The NC SOV 220 is controlled via the electrical power line 219 from a controller, and a power source to energize or deenergize the NC SOV 220. The controller and the electrical power source can be disposed on the surface or at a location remote from the well.

A hydraulic line branch 216B of the hydraulic line 216 connects to the check valve 260 which then connects to the X-port 220X of the NC SOV 220 via a hydraulic line 204. The check valve 260 is disposed along a path formed by the hydraulic line branch 216B and the hydraulic line 204 to allow fluid flow from the X-port 220X and block flow from the hydraulic line branch 216B to the X-port of the NC SOV 220. The hydraulic line 204 branches to connect to the check valve 262 via hydraulic line branch 204A. A hydraulic line 205 connects the check valve 262 to the flow fuse 270.

The shuttle valve 240 has three ports: A-port 240A, B-port 240B, and C-port 240C. The shuttle valve 240 includes internal components that allow hydraulic communication between A-port 240A and C-port 240C when the pressure on A-port 240A is higher than the pressure on the B-port 240B. When the pressure on B-port 240B is higher than the pressure on A-port 240A, hydraulic communication is allowed between B-port 240B and C-port 240C. Hydraulic communication between the ports of the shuttle valve 240 can be unidirectional or bi-directional. A hydraulic branch 216A of the hydraulic line 216 connects to the A-port 240A. A hydraulic line 203 connects the C-port 240C to the P-port 220P of the NC SOV 220. A hydraulic line 207 connects the B-port 240B to the dynamic flow restrictor 230, and branches to connect to the hydraulic line 205 via hydraulic line branch 207A.

The dynamic flow restrictor 230 has an automatically adjustable variable-metering orifice. The dynamic flow restrictor 230 is configured to provide a constant volumetric flow rate therethrough. The dynamic flow restrictor 230 senses the volumetric flow rate in terms of a differential pressure across a fixed orifice, and the variable metering orifice then automatically adjusts to keep the volumetric flow rate constant over a range of pressure differentials across the dynamic flow restrictor 230. The dynamic flow restrictor 230 protects the NC SOV 220 and can also be used to provide bidirectional choke capability to the ICV 212. The dynamic flow restrictor 230 connects to the open side 214 of the ICV 212.

The flow fuse 270 is coupled to the hydraulic line 217 and further coupled with the check valve 262, the B-port 240B of the shuttle valve 240, and the dynamic flow regulator/restrictor 230. The flow fuse 270 is also coupled with the close side 213 of the ICV 212. The flow fuse 270 is configured to function as a normally open check valve that closes as the differential pressure increases beyond a specified value across the flow fuse 270. The flow fuse 270 can include a ball or poppet, e.g., biased by one or more spring, that shuts against a valve seat and blocks hydraulic communication when the differential pressure increases. The flow fuse 270 remains open until the differential pressure across the fuse increases to a specific value. The flow fuse 270 operates as a bypass to equalize two hydraulic lines or paths. In FIG. 2, the flow fuse 270 is bidirectional. However, the flow fuse 270 could be replaced by two unidirectional flow fuses coupled in parallel and oriented in opposite directions. A unidirectional flow fuse only allows hydraulic communication in one direction, until the fuse is activated due to a differential pressure. For example, a first unidirectional flow fuse can function to be open in a first direction until the differential pressure in the first direction increases to reach the specified value, and a second unidirectional flow fuse can be disposed in parallel with the first unidirectional flow fuse and can function to be open in a second direction until the differential pressure in the second direction increases to reach the specified value. Embodiments can replace the flow fuse with a bidirectional pilot to close (PTC) check valve or two PTC check valves disposed in series.

The check valve 260 is disposed between the hydraulic line branch 216B and the hydraulic line 204. The check valve 260 is oriented to allow flow from X-port 220X and to block flow from the hydraulic line 216 toward the X-port 220X. The check valve 262 is also coupled with the X-port 220X on one end and with the flow fuse 270, the dynamic flow restrictor 230, and the B-port 240B of the shuttle valve 240. The check valve 262 is oriented to prevent flow to the X-port 220X and to allow flow to the flow fuse 270 and the dynamic flow restrictor 230 (and possibly from the B-port 240B of the shuttle valve 240).

In operation, hydraulic line 216 and hydraulic line 217 can be pressurized, respectively, in combination with energizing or deenergizing the NC SOV 220, to open or close, at least partially, the ICV 212.

To actuate the ICV 212 in an open direction, pressure on hydraulic line 216 is increased via the hydraulic power system 113. Once pressure on hydraulic line 216 is greater than pressure on hydraulic line 217, the higher pressure on the A-port 240A of the shuttle valve 240 will allow hydraulic communication between A-port 240A and C-port 240C. The pressure from hydraulic line 216 supplies a differential pressure which forces fluid out the C-port 240C and into hydraulic line 203 towards the P-port 220P of the NC SOV 220 (which is closed when the NC SOV is deenergized).

When the controller energizes the NC SOV 220 to actuate it, i.e., open, the NC SOV 220 moves from the closed position to the open position to allow hydraulic communication between the P-port 220P to the X-port 220X and on to the check valve 262. Pressure from hydraulic line 216 forces fluid from the check valve 262 through both the flow fuse 270 and the dynamic flow restrictor 230. As the differential pressure across the flow fuse 270 increases, the flow fuse will close above a threshold value of differential pressure. When this occurs, hydraulic communication between the close side 213 of the ICV 212 and the flow fuse 270 ceases. The differential pressure from hydraulic line 216 will then direct fluid through the dynamic flow restrictor 230 towards the open side 214 of the ICV 212. The variable metering orifice of the of the dynamic flow restrictor 230 automatically adjusts to maintain a constant differential pressure across the dynamic flow restrictor. A restrictor can be added to the electro-hydraulic circuit in the flow path between the flow fuse 270 and the dynamic flow restrictor 230 to account for the possibility of the pressure differential across the flow fuse 270 not being sufficient to ensure closure of the flow fuse 270, e.g., by an inner piston shifting and sealing. As the pressure is applied to the open side 214 of the ICV 212, pressure is relieved in the close side 213 thereby causing the ICV 212 to open. Pressure is relieved from the close side 213 to hydraulic line 217 where fluid is able to be released through the hydraulic line 217, e.g., directed back to the hydraulic power system 113. The ICV 212 will continue to move in the open direction until the NC SOV 220 is shifted to a deenergized state, e.g., via actuation from the controller.

To actuate the ICV 212 in a close direction, the pressure is increased in hydraulic line 217 by the hydraulic power system 113. Once the second hydraulic line 217 is pressurized, the flow fuse 270 will equalize the pressure in both chambers of the ICV 212. Simultaneously, hydraulic line 216 and hydraulic line 217 will be isolated by the shuttle valve 240, the check valve 262, and the NC SOV 220 being in the deenergized state. The higher pressure from hydraulic line 217 on the B-port 240B of the shuttle valve 240 will allow hydraulic communication between B-port 240B and C-port 240C as the differential pressure forces fluid out of C-port 240C into hydraulic line 203 towards the P-port 220P of the deenergized NC SOV.

When the controller addresses the NC SOV 220 to energize, i.e., sends an energize command thereto, the NC SOV 220 moves from the closed position to the open position to allow hydraulic communication between the X-port 220X and P-port 220P of the NC SOV 220. The higher pressure on hydraulic line 217 forces fluid through the flow fuse 270 (as it is bi-directional) until increased differential pressure across the flow fuse 270 triggers the bypass of the flow fuse 270 such that the hydraulic communication through the flow fuse 270 ceases. Once hydraulic communication through the flow fuse 270 ceases, pressure from the hydraulic line 217 will be able to force fluid into the close side 213 of the ICV 212 to push the double-actuated floating piston 215 towards the open side 214, i.e., moving the ICV 212 in a close direction, as pressure in the open side 214 is relieved through dynamic flow restrictor 230 and through the B-port 240B of shuttle valve 240, though the C-port 240C, along hydraulic line 203, through the open NC SOV, and out through the first check valve 260 where fluid is returned to the hydraulic power system 113 along hydraulic line 216 until pressure in the circuit equalizes. The ICV 212 will continue to move in the close direction until the NC SOV 220 is shifted to a deenergized state, e.g., via actuation from the controller.

In both of the above directions of movement, i.e., open or close, movement of the ICV 212 can be halted by deenergizing the NC SOV 220. For example, deenergizing the NC SOV 220 halts the opening of the ICV 212 even when the hydraulic line 216 exerts a differential pressure on the circuit. Pressure supply is blocked to the ICV 212 and hydraulic communication is allowed between X-port 220X and R-port 220R such that pressure will be equalized across the check valve 260, the dynamic flow restrictor 230, and the flow fuse 270. The pressure equalization once pressure supply from hydraulic line 216 is blocked will halt movement of the ICV 212. Check valve 260, shuttle valve 240, hydraulic line branches 216A and 216B remain pressurized until the NC SOV 220 is actuated again. Deenergizing the NC SOV 220 also halts the closing of the ICV 212 even when the hydraulic line 217 exerts a differential pressure on the circuit. Pressure supplied to hydraulic line 217 forces fluid into the close side 213 of the ICV and into the flow fuse 270. Pressure is blocked by the check valve 262 and proceeds to the shuttle valve 240 through the B-port 240B and out the C-port 240C. Pressure is halted along hydraulic line 203 and the P-port 220P of the NC SOV 220 when the NC SOV deenergizes. Back pressure effectively builds in the circuit until a differential pressure across the flow fuse 270 triggers the bypass in which hydraulic communication across the fuse 270 ceases. Pressure from hydraulic line 217 applies a closing force to the double-actuated piston 215 in ICV 212, but pressure in the open side 214 cannot be relieved. The back pressure in the circuit through the dynamic flow restrictor 230, shuttle valve 240, and hydraulic line 203 applies a force back on to the piston, which will halt the closing of the ICV when the differential pressure across the double-actuated piston 215, i.e., the pressure of the open side 214 and the pressure of the close side 213, equalizes.

Figure 3:
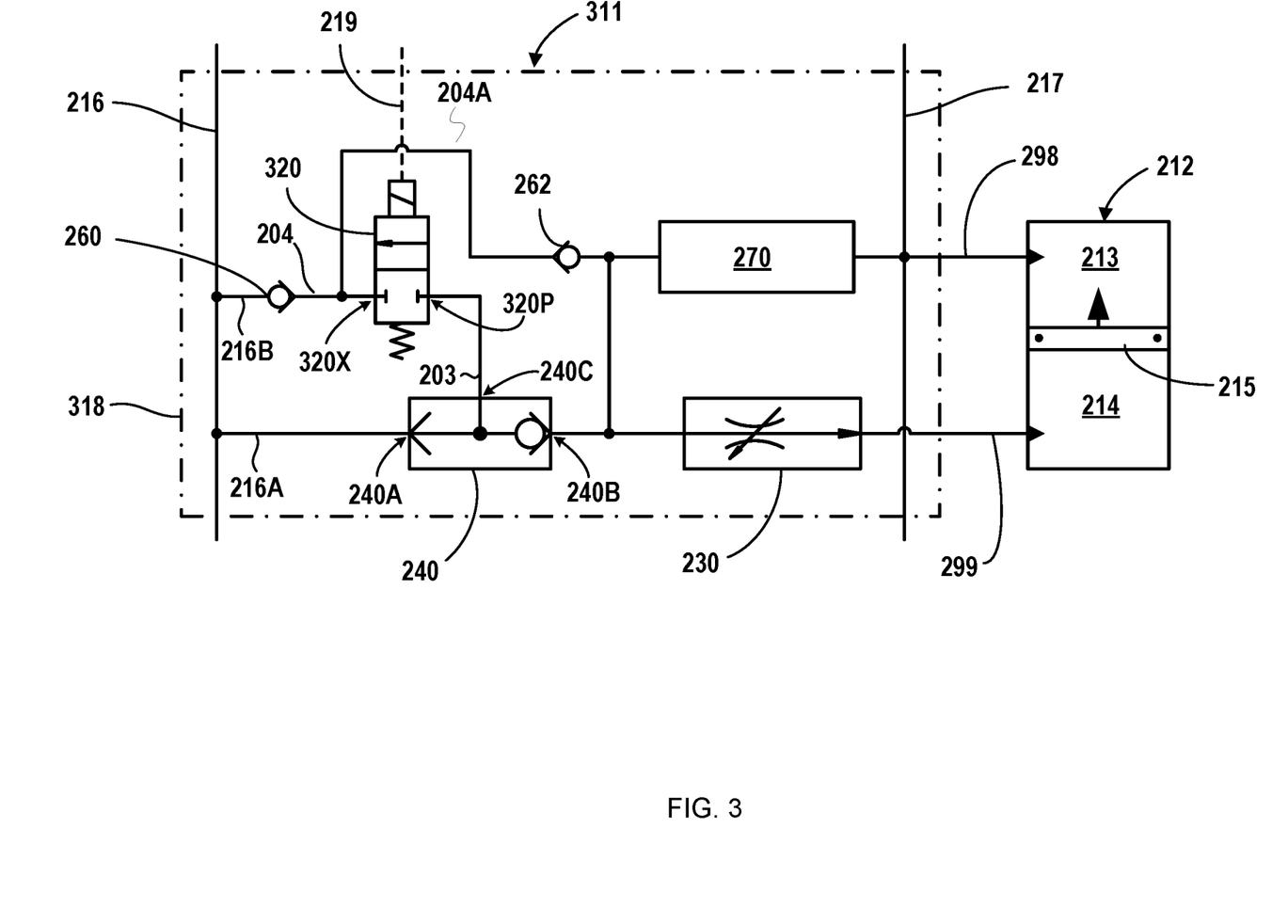
FIG. 3 depicts components of a control module of an electro-hydraulic circuit with a two-way NC SOV for actuating an ICV.

FIG. 3 depicts components of a control module of an electro-hydraulic circuit with a two-way NC SOV for actuating an ICV. The electro-hydraulic circuit 300 includes a control module 311 which further includes a housing 318. The housing 318 protects the components of the control module 311. The components of the control module 311 include a two-way NC SOV 320, a dynamic flow regulator/restrictor 230, a shuttle valve 240, a check valve 260, a check valve 262 and a flow fuse 270. The components of the control module 311 are disposed within the housing 318.

Control module 311 is similar to the control module 211 in electro-hydraulic circuit 200 having hydraulic line 216 hydraulic line 217, and the electric line 219 coupled there. However, instead of a 3-way NC SOV, the electro-hydraulic circuit 300 has 2-way NC SOV 320 comprising only two ports: a pressure port or P-port 320P and a control port or X-port 320X. The P-port 320P is coupled to the C-port 240C of the shuttle valve 240 and the X-port 320X is coupled with the check valve 260 via the hydraulic line 204 and also to check valve 262 via the hydraulic line branch 204A that branches from the hydraulic line 204. The check valve 260 is disposed, i.e., oriented, to allow flow from X-port 320X and to block flow from hydraulic line 216 toward the X-port 320X. As the R-port 220R in the 3-way NC SOV 220 in the electro-hydraulic circuit of FIG. 2 is not utilized, the operation of the electro-hydraulic circuit of FIG. 3 will open and close the ICV 212 in a similar manner.

Figure 4:
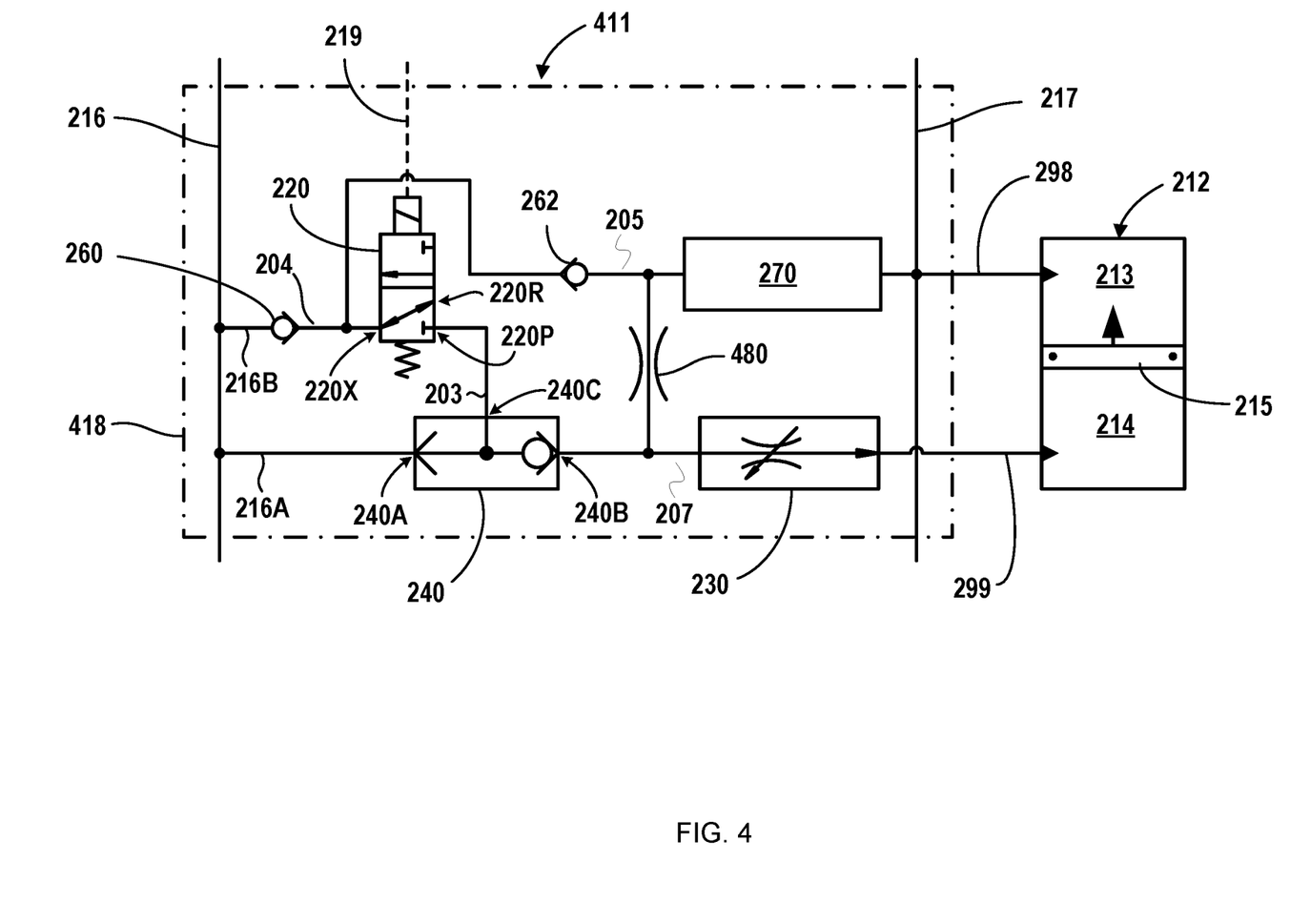
FIG. 4 depicts a control module of an electro-hydraulic circuit with a three-way NC SOV and flow restrictor for controlling the ICV.

FIG. 4 depicts a control module of an electro-hydraulic circuit with a three-way NC SOV and flow restrictor for controlling the ICV. The electro-hydraulic circuit includes a control module 411. The control module 411 is similar to the control module 211. The control module 411 components include the three-way NC SOV 220, the dynamic flow regulator/restrictor 230, the shuttle valve 240, the check valve 260, the check valve 262, and the flow fuse 270. In addition, the control module includes a restrictor 480. The restrictor 480 is coupled between the hydraulic line 205, which hydraulically couples the flow fuse 270 and the check valve 262, and the hydraulic line 207, which couples the shuttle valve 240 and the flow regulator 230. The restrictor 480 helps to ensure a pressure differential across the fuse 270 to prevent the fuse 270 from failing to close and seal.

Figure 5:
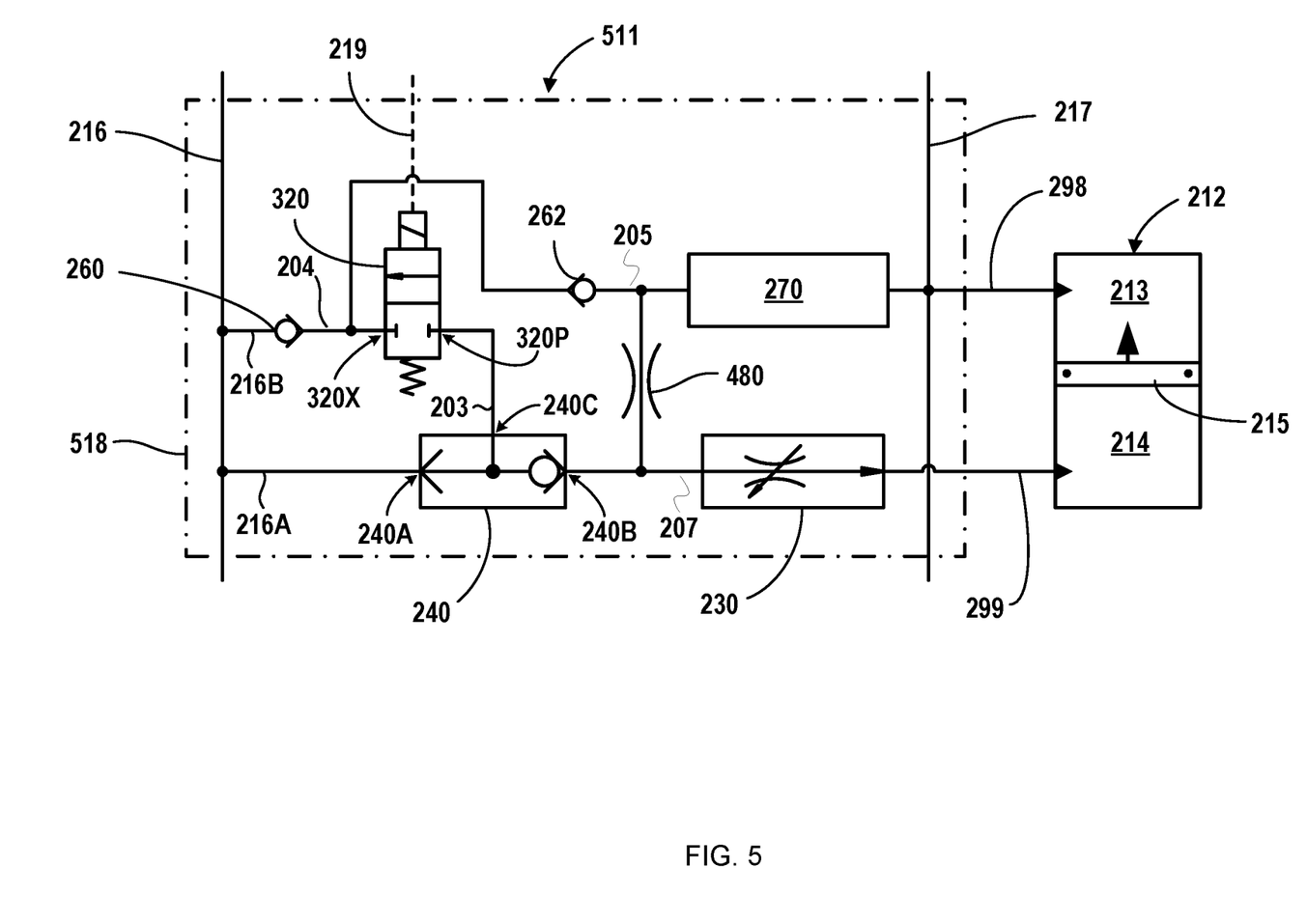
FIG. 5 depicts a control module of an electro-hydraulic circuit with a two-way NC SOV and a flow restrictor for actuating an ICV.

FIG. 5 depicts a control module of an electro-hydraulic circuit with a two-way NC SOV and a flow restrictor for actuating an ICV. The electro-hydraulic circuit illustrated in FIG. 5 includes a control module 511 that is similar to the control module 311 of FIG. 3. The components of the control module 511 include the two-way NC SOV 320, the dynamic flow regulator/restrictor 230, the shuttle valve 240, the check valve 260, the check valve 262, and the flow fuse 270. Unlike the control module 311, the control module 511 includes the restrictor 480 similar to the control module 411.

Figure 6:
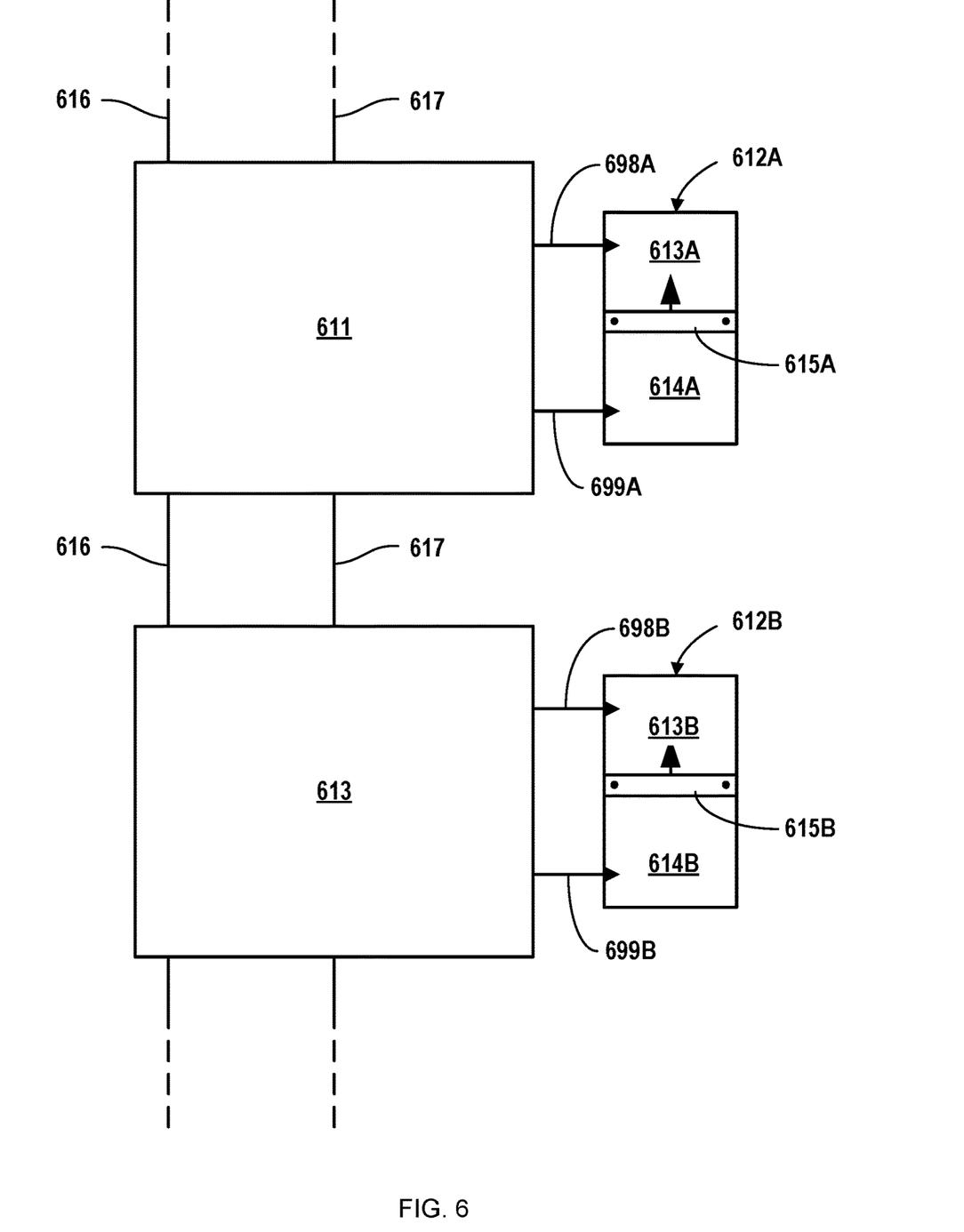
FIG. 6 depicts a plurality of electro-hydraulic control modules in a stacked configuration.

FIG. 6 depicts a plurality of electro-hydraulic control modules in a stacked configuration. Two control modules are shown: control module 611 and control module 613. Each of the control modules 611-613 is similar to any one of the control modules depicted in FIGS. 2-5. Each control module is correlated to its own pay zone, i.e., hydrocarbon-producing formation, when in the stacked configuration. The control modules 611, 613 are hydraulically connected to ICVs 612A, 612B, respectively. The control module 611 is connected to the ICV 612A by hydraulic lines 698A, 699A. The control module 613 is connected to the ICV 612B by hydraulic lines 698B, 699B. The control modules 611, 613 are said to be "stacked" because the same hydraulic lines (hydraulic line 616 and hydraulic line 617) are used to charge more than one control module. The hydraulic line 616 and hydraulic line 617 can use a tee to branch to the control modules 611, 613. A dynamic flow restrictor can be placed on hydraulic line 616 and/or hydraulic line 617 above and/or between control modules to provide flow control to facilitate conformance with an operating pressure range of the control modules. The placement of the dynamic flow restrictor above and/or between control modules on hydraulic line 616 and/or hydraulic line 617 may depend on a variety of factors including the distance between control modules, the depth of a control module, and the pressure exerted on a control module by a hydraulic power system.

For a stacked configuration, individual control of NC SOVs allows individual actuation of ICVs via the electro-hydraulic circuits with the shared hydraulic lines. With pressure of one hydraulic line greater than the other hydraulic line, NC SOVs in each of the control modules 611-613 can be energized or deenergized to change state of a corresponding ICV. For example, with pressure on hydraulic line 616 greater than pressure on hydraulic line 217, an NC SOV (e.g., NC SOV 220) in the first control module 611 can be energized to open the ICV 612A, an NC SOV in the control module 613 can be energized to open the ICV 612B, or both can occur simultaneously. In another example, with pressure on hydraulic line 617 greater than pressure on hydraulic line 616 an NC SOV in the control module 611 can be energized to close the ICV 612A, a NC SOV in the control module 613 can be energized to close the ICV 612B, or both can occur simultaneously. In one or more embodiments, a circuit disposed downhole, e.g., a multiplexer or the like, can be used to separately address the NC SOVs of the stacked control modules, e.g., via an electric line. Thus, stacking the control modules allows the system to shared hydraulic lines for control of a plurality of ICVs. Stacking also allows the use of only one electrical power line to the surface, e.g., via TEC. In a single control module configuration, the hydraulic lines terminate within or proximate to the "last" or "stack termination" control module (i.e., the last control module in the series).

Variations

While the aspects of the disclosure are described with reference to various implementations and exploitations, it will be understood that these aspects are illustrative. In general, techniques for opening and closing ICVs as described herein may be implemented with facilities consistent with any hardware system or hardware systems. Many variations, modifications, additions, and improvements are possible. For instance, some embodiments may split the components of the disclosed electro-hydraulic controller into different housings. This may be done to satisfy space constraints. When components of the electro-hydraulic controller are disposed within different housings, a tee block or a flow divider is used for branching of hydraulic lines into the different housings. In addition, embodiments are not limited to placement of the dynamic flow regulator as disclosed herein. While the disclosed illustrations are based on a preference to place the dynamic flow regulator proximate to the ICV actuated by the electro-hydraulic controller, embodiments can place the dynamic flow regulator anywhere on a hydraulic line among the components that form an electro-hydraulic controller. In embodiments with components disposed within different housings, a dynamic flow regulator may be disposed within each housing or fewer than all of the housings.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment #1: A system comprising: tubing; an interval control valve (ICV) coupled to the tubing, the ICV having an open side and a close side; a first hydraulic line and a second hydraulic line that are coupled with a hydraulic power system; a first electrical power line coupled with an electrical power source; and a set of one or more housings that enclose, a shuttle valve hydraulically coupled with the first hydraulic line and hydraulically coupled with a normally closed (NC) solenoid valve (SOV); a first check valve hydraulically coupled between the first hydraulic line and the NC SOV; a second check valve having a first port hydraulically coupled with the NC SOV and a second port hydraulically coupled with a set of one or more flow fuses, the shuttle valve, and a dynamic flow restrictor; the dynamic flow restrictor having a first port that is hydraulically coupled with the set of one or more flow fuses, the shuttle valve, the second port of the second check valve, and having a second port that is hydraulically coupled with the open side of the ICV; and the set of one or more flow fuses hydraulically coupled with the close side of the ICV.

Embodiment #2: The system of Embodiment 1, wherein the first hydraulic line is hydraulically coupled with an A-port of the shuttle valve, the first port of the dynamic flow restrictor is hydraulically coupled with the B-port of the shuttle valve, and a P-port of the NC SOV is hydraulically coupled with a C-port of the shuttle valve.

Embodiment #3: The system of Embodiment 2, wherein the first port of the second check valve is hydraulically coupled with the X-port of the NC SOV.

Embodiment #4: The system of any one of Embodiments 1-3, wherein the dynamic flow restrictor includes an automatically adjustable variable-metering orifice.

Embodiment #5: The system of Embodiment 4, wherein the dynamic flow restrictor is configured to maintain a constant differential pressure across the dynamic flow restrictor.

Embodiment #6: The system of any one of Embodiments 1-5, wherein the set of one or more flow fuses comprises a bidirectional flow fuse.

Embodiment #7: The system of any one of Embodiments 1-6, wherein the set of one or more flow fuses comprise a first and a second unidirectional flow fuses that are oriented in opposite directions and coupled together, wherein the first unidirectional flow fuse is hydraulically coupled with the close side of the ICV and the second unidirectional flow fuse is hydraulically coupled with the second port of the second check valve and the dynamic flow restrictor.

Embodiment #8: The system of any one of Embodiments 1-7, wherein at least a first of the set of one or more housings further comprises a third hydraulic line which couples the set of one or more flow fuses to the close side of the ICV, and a fourth hydraulic line which couples the dynamic flow restrictor to the open side of the ICV.

Embodiment #9: The system of any one of Embodiments 1-8, wherein the hydraulic power system comprises at least one of a pump or manifold.

Embodiment #10: The system of any one of Embodiments 1-9, wherein the NC SOV is a 3-way NC SOV or a 2-way NC SOV.

Embodiment #11: The system of any one of Embodiments 1-10 further comprising a flow restrictor having a first port hydraulically coupled with the second port of the second check valve and the set of one or more flow fuses and having a second port hydraulically coupled with the first port of the dynamic flow restrictor and the B-port of the shuttle valve.

Embodiment #12: An apparatus comprising: a shuttle valve hydraulically coupled with a first hydraulic line and hydraulically coupled with a normally closed (NC) solenoid valve (SOV); a first check valve hydraulically coupled between the first hydraulic line and the NC SOV; a second check valve having a first port hydraulically coupled with the NC SOV and a second port hydraulically coupled with a set of one or more flow fuses, the shuttle valve, and a dynamic flow restrictor; the dynamic flow restrictor having a first port that is hydraulically coupled with the set of one or more flow fuses, the shuttle valve, the second port of the second check valve, and having a second port to hydraulically couple with an open side of an interval control valve (ICV); and the set of one or more flow fuses to hydraulically couple with a close side of the ICV and a second hydraulic line.

Embodiment #13: The apparatus of Embodiment 12 further comprising a flow restrictor having a first port hydraulically coupled with the second port of the second check valve and the set of one or more flow fuses and having a second port hydraulically coupled with the first port of the dynamic flow restrictor and the B-port of the shuttle valve.

Embodiment #14: The apparatus of any one of Embodiments 12-13, further comprising a housing having apertures to route the first and second hydraulic lines and apertures to route third and fourth hydraulic lines from the dynamic flow restrictor and the set of one or more flow fuses to the ICV.

Embodiment #15: The apparatus of any one of Embodiments 12-14, wherein the set of one or more flow fuses is a bidirectional fuse.

Embodiment #16: The apparatus of any one of Embodiments 12-15, wherein the set of one or more flow fuses comprises a first unidirectional flow fuse and a second unidirectional flow fuse coupled together and oppositely oriented, wherein the first unidirectional flow fuse is to hydraulically couple with the close end of the ICV and the second unidirectional flow fuse is hydraulically coupled with the dynamic flow restrictor and the second check valve.

Embodiment #17: The apparatus of any one of Embodiments 12-16, wherein the NC SOV is a 2-way NC SOV or a 3-way NC SOV.

Embodiment #18: A method comprising: charging a first hydraulic line to have greater pressure than a second hydraulic line and energizing a solenoid valve, wherein charging the first hydraulic line and energizing the solenoid valve initiates transition of an internal control valve (ICV) from a first state to a second state; and discontinuing energizing the solenoid valve and maintaining the greater pressure in the first hydraulic line until the ICV reaches a desired state.

Embodiment #19: The method of Embodiment 18, further comprising: deenergizing the NC SOV to halt movement of the ICV.

Embodiment #20: The method of any one of Embodiments 18-19, wherein the first state and the second state respectively correspond to an open state and a close state.

The invention claimed is:

1. A system comprising:
    tubing;
    an interval control valve (ICV) coupled to the tubing, the ICV having an open side and a close side;
    a first hydraulic line and a second hydraulic line that are coupled with a hydraulic power system;
    a first electrical power line coupled with an electrical power source; and
    a set of one or more housings that enclose,
        a shuttle valve hydraulically coupled with the first hydraulic line and hydraulically coupled with a normally closed (NC) solenoid valve (SOV);
        a first check valve hydraulically coupled between the first hydraulic line and the NC SOV;
        a second check valve having a first port hydraulically coupled with the NC SOV and a second port hydraulically coupled with a set of one or more flow fuses, the shuttle valve, and a dynamic flow restrictor;
        the dynamic flow restrictor having a first port that is hydraulically coupled with the set of one or more flow fuses, the shuttle valve, the second port of the second check valve, and having a second port that is hydraulically coupled with the open side of the ICV; and
        the set of one or more flow fuses hydraulically coupled with the close side of the ICV.

2. The system of claim 1, wherein the first hydraulic line is hydraulically coupled with an A-port of the shuttle valve, the first port of the dynamic flow restrictor is hydraulically coupled with a B-port of the shuttle valve, and a P-port of the NC SOV is hydraulically coupled with a C-port of the shuttle valve.

3. The system of claim 2, wherein the first port of the second check valve is hydraulically coupled with a X-port of the NC SOV.

4. The system of claim 2, further comprising a secondary restrictor hydraulically coupled with second check valve, the set of one or more flow fuses, the dynamic flow restrictor, and the B-port of the shuttle valve.

5. The system of claim 1, wherein the dynamic flow restrictor includes an automatically adjustable variable-metering orifice.

6. The system of claim 5, wherein the dynamic flow restrictor is configured to maintain a constant differential pressure across the dynamic flow restrictor.

7. The system of claim 1, wherein the set of one or more flow fuses comprises a bidirectional flow fuse.

8. The system of claim 1, wherein the set of one or more flow fuses comprise first and second unidirectional flow fuses that are oriented in opposite directions and coupled together, wherein the first unidirectional flow fuse is hydraulically coupled with the close side of the ICV and the second unidirectional flow fuse is hydraulically coupled with the second port of the second check valve and the dynamic flow restrictor.

9. The system of claim 1, wherein at least a first of the set of one or more housings further comprises a third hydraulic line which couples the set of one or more flow fuses to the close side of the ICV, and a fourth hydraulic line which couples the dynamic flow restrictor to the open side of the ICV.

10. The system of claim 1, wherein the hydraulic power system comprises at least one of a pump or manifold.

11. The system of claim 1, wherein the NC SOV is a 3-way NC SOV or a 2-way NC SOV.

12. An apparatus comprising:
    a shuttle valve hydraulically coupled with a first hydraulic line and hydraulically coupled with a normally closed (NC) solenoid valve (SOV);
    a first check valve hydraulically coupled between the first hydraulic line and the NC SOV;
    a second check valve having a first port hydraulically coupled with the NC SOV and a second port hydraulically coupled with a set of one or more flow fuses, the shuttle valve, and a dynamic flow restrictor;
    the dynamic flow restrictor having a first port that is hydraulically coupled with the set of one or more flow fuses, the shuttle valve, the second port of the second check valve, and having a second port to hydraulically couple with an open side of an interval control valve (ICV); and
    the set of one or more flow fuses to hydraulically couple with a close side of the ICV and a second hydraulic line.

13. The apparatus of claim 12, further comprising a secondary restrictor hydraulically coupled with the second check valve, the set of one or more flow fuses, the dynamic flow restrictor, and a B-port of the shuttle valve.

14. The apparatus of claim 12, further comprising: a housing having a first set of apertures to route the first and second hydraulic lines and a second set of apertures to route third and fourth hydraulic lines from the dynamic flow restrictor and the set of one or more flow fuses to the ICV.

15. The apparatus of claim 12, wherein the set of one or more flow fuses includes a bidirectional fuse.

16. The apparatus of claim 12, wherein the set of one or more flow fuses comprises a first unidirectional flow fuse and a second unidirectional flow fuse coupled together and oppositely oriented, wherein the first unidirectional flow fuse is to hydraulically couple with the close side of the ICV and the second unidirectional flow fuse is hydraulically coupled with the dynamic flow restrictor and the second check valve.

17. The apparatus of claim 12, wherein the NC SOV is a two-way NC SOV or a three-way NC SOV.

\* \* \* \* \*